J. H. FULLMER.
MULTIPLE TOOL HOLDER.
APPLICATION FILED JAN. 10, 1920.
1,352,949.
Patented Sept. 14, 1920.
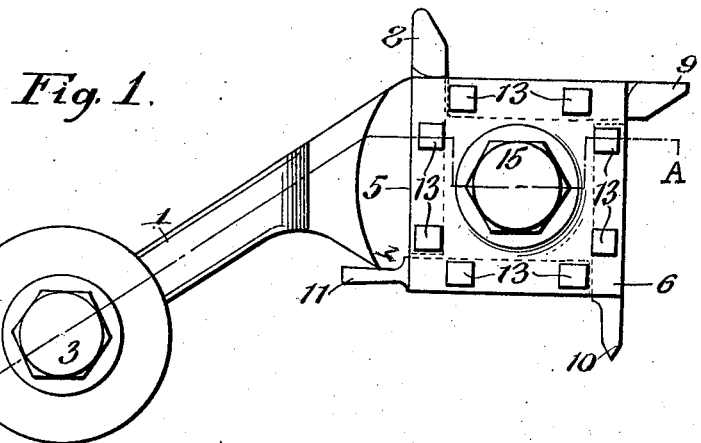
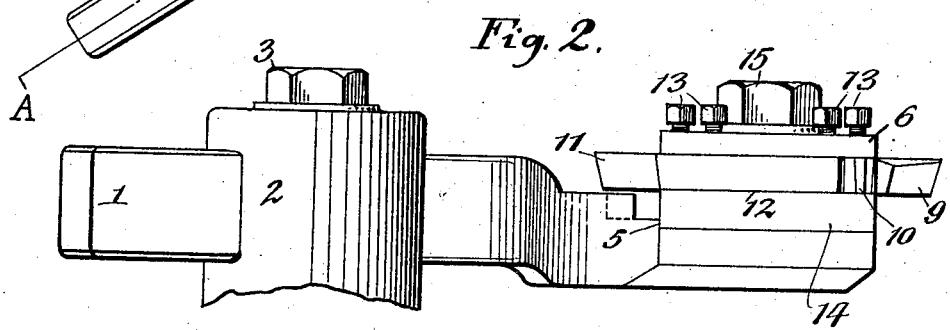
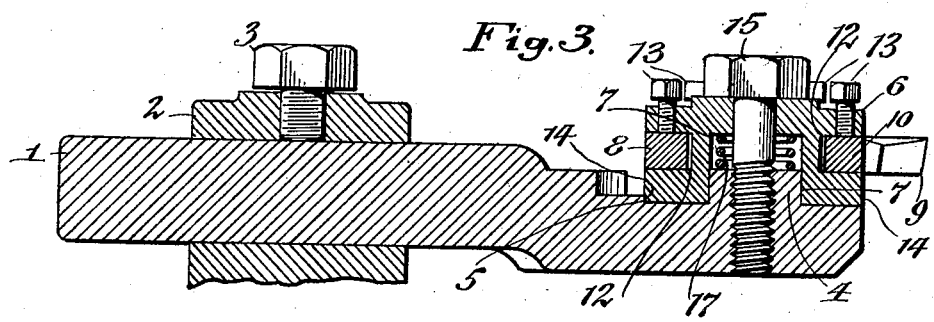
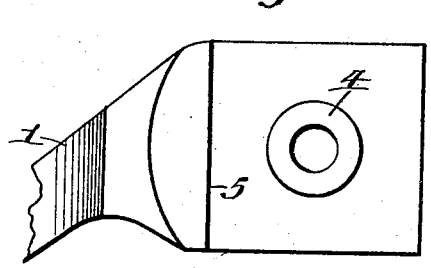
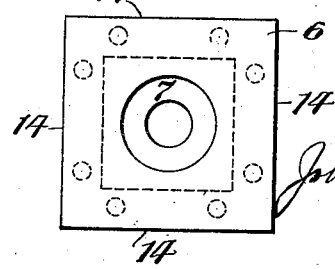
INVENTOR
John H. Fullmer
BY
ATTORNEYS

UNITED STATES PATENT OFFICE.

JOHN H. FULLMER, OF BUFFALO, NEW YORK.

MULTIPLE-TOOL HOLDER.

1,352,949.   Specification of Letters Patent.   Patented Sept. 14, 1920.

Application filed January 10, 1920. Serial No. 350,579.

*To all whom it may concern:*

Be it known that I, JOHN H. FULLMER, a citizen of the United States, residing in Buffalo, in the county of Erie and the State of New York, have invented new and useful Improvements in Multiple-Tool Holders, of which the following is a specification.

This invention relates to a multiple tool holder for use in connection with lathes to permit a variety of tools to be presented in rapid succession to the work piece for performing different operations thereon. It is the object of this invention to provide a holder of this character which can be substituted for the single tool as now usually mounted on the tool post and successively present different tools to the working position easily and quickly and thus enable an operator to increase his output for a given time.

In the accompanying drawings:

Figure 1 is a top plan view of a multiple tool embodying my improvements. Fig. 2 is a side elevation thereof. Fig. 3 is a vertical longitudinal section thereof, the section being taken on line A—A, Fig. 1. Fig. 4 is a detached top plan view of the supporting arm of the tool holder. Fig. 5 is a bottom plan view of the supporting turret which carries the different tools.

Similar characters of reference refer to like parts throughout the several views.

1 represents the supporting arm of the multiple tool holder which is secured at its rear end in an opening in a tool post 2 by means of a clamping screw 3. On the upper side of its front end the supporting arm is provided with a circular centering boss 4 preferably of cylindrical form and a straight shoulder 5 which faces the axis of said boss and is arranged perpendicular to a radial line therefrom.

Above the front part of the supporting arm is arranged a supporting turret 6 which is preferably square in circumference and provided on its underside with a cylindrical socket 7 which receives the boss of said arm so that the turret can turn about the axis of said boss as well as slide lengthwise thereof for bringing different tools on the supporting turret to the working position and holding them rigidly in place. As shown in the drawings, four tools 8, 9, 10 and 11 are mounted on the turret so as to project tangentially therefrom in four different directions. Although tools of any desired character may be employed, those, for example shown in the drawings, consist of a rough turning tool 8, a finish turning tool 9, a threading tool 10 and a cutting-off tool 11. These tools may be secured to the supporting turret in any suitable manner but preferably by providing the turret on the four sides of its periphery with grooves 12 in each of which the shank or rear end of one of the tools is secured by means of a pair of clamping screws 13 arranged on the upper part of the turret and bearing against the upper side of the respective tool.

In its operative position the turret rests with its underside upon the top of the supporting arm so that one of the facets or shoulders 14 formed by the lower part of its square periphery engages with the shoulder 5 of the supporting arm, whereby the turret is positively held against being turned by the thrust of the work piece against the tool which for the time is in the operative position. The turret is firmly clamped in its lower position against the supporting arm by a clamping screw 15 the shank or body of which passes through axial openings in the turret and boss and engages its lower externally screw threaded end with an internal screw thread in the boss while the head at its upper end engages with the top of the turret.

For the purpose of automatically raising the turret and disengaging the same from the shoulder 5 of the supporting arm upon loosening the clamping screw 15 a spring 17 is employed which is arranged in the socket 7 around the screw 15 and bears at its upper end against the bottom of said socket while its lower end bears against the upper end of said boss 4.

For the purpose of replacing the tool in the working position by another, the clamping screw 15 is loosened sufficiently to permit the spring 17 to raise the turret above the shoulder 5 of the supporting arm after which the turret can be turned freely for bringing the desired tool to the working position, after which tightening of the screw 15 will again lower the turret and secure the same against the arm so that another shoulder or facet of the turret engages with the shoulder 5 of the arm and these parts are reliably held against turning relatively to each other when subjected to pressure while the tool is in use.

This tool holder is not only very useful in that it permits a variety of tools to be used expeditiously and efficiently but the same can also be produced economically and of such form that the same is not liable to get out of order.

I claim as my invention:

1. A multiple tool holder comprising a supporting arm, a turret adapted to support a plurality of tools on different parts of its periphery, and means by which said turret is pivotally connected with said arm and relatively to which said turret is movable lengthwise of the axis thereof, said arm being provided with a shoulder facing the axis of said turret, said arm being provided with a centering boss around said axis and said turret being provided with a circular socket around said axis which receives said boss.

2. A multiple tool holder comprising a supporting arm, a turret adapted to support a plurality of tools on different parts of its periphery, means by which said turret is pivotally connected with said arm and relatively to which said turret is movable lengthwise of the axis thereof, said arm being provided with a shoulder facing the axis of said turret, said arm being provided with a centering boss around said axis and said turret being provided with a circular socket around said axis which receives said boss, and a spring engaging its opposite ends with the end of said boss and the bottom of said socket.

3. A multiple tool holder comprising a supporting arm provided at its front end with a centering boss, and a shoulder arranged perpendicular to a radial line from said boss, a turret adapted to support a plurality of tools on different parts of its periphery and provided with a circular socket which receives said boss and a plurality of flat shoulders on different parts of its periphery any one of which is adapted to engage said shoulder of the supporting arm, a clamping bolt passing through said turret and boss, and a spring arranged in said socket between said boss and turret.

JOHN H. FULLMER.